United States Patent
Hutchinson

(10) Patent No.: US 12,194,677 B2
(45) Date of Patent: Jan. 14, 2025

(54) APPARATUS AND METHOD FOR SUPPORT REMOVAL

(71) Applicant: PostProcess Technologies, Inc., Buffalo, NY (US)

(72) Inventor: Daniel Joshua Hutchinson, Orchard Park, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 1217 days.

(21) Appl. No.: 16/931,338

(22) Filed: Jul. 16, 2020

(65) Prior Publication Data
US 2020/0391436 A1 Dec. 17, 2020

Related U.S. Application Data

(60) Division of application No. 16/519,237, filed on Jul. 23, 2019, now Pat. No. 10,737,440, which is a
(Continued)

(51) Int. Cl.
*B29C 64/188* (2017.01)
*B08B 3/00* (2006.01)
(Continued)

(52) U.S. Cl.
CPC ............ *B29C 64/188* (2017.08); *B08B 3/006* (2013.01); *B08B 3/08* (2013.01); *B08B 3/10* (2013.01);
(Continued)

(58) Field of Classification Search
CPC .. B08B 3/006; B08B 3/08; B08B 3/10; B08B 3/102; B08B 3/12; B08B 2203/007
See application file for complete search history.

(56) References Cited

U.S. PATENT DOCUMENTS 4,651,762 A * 3/1987 Bowden ................... C23G 3/00
134/40
5,322,078 A 6/1994 Tuttle
(Continued)

FOREIGN PATENT DOCUMENTS

| JP | H10113626 A | 5/1998 |
|----|----|----|
| JP | 2011005668 A | 1/2011 |
| KR | 20130006252 A | 10/2013 |

OTHER PUBLICATIONS

Office Action from German Patent Application No. 11 2017 002 807.8, dated Dec. 18, 2023, 10 pages (including English translation).

*Primary Examiner* — Cristi J Tate-Sims
(74) *Attorney, Agent, or Firm* — Lempia Summerfield Katz LLC

(57) ABSTRACT

An apparatus and method for removing support material from a part formed by three-dimensional (3D) printing. The support removal machine contains a tank for submersion of a 3D printed part into a liquid mass. The liquid mass circulates in the tank in a controlled manner such that submerged parts remain centrally suspended in the tank, regardless of the material, density and geometry comprising the part. The part circulates and rotates in conjunction with the rotational flow of the liquid mass for uniform exposure to means of support removal. During rotation, the part may be subjected to multiple means of agitation that include heat, chemical and ultrasonic, in order to optimize energy use and maximize efficiency of the removal of support material.

18 Claims, 4 Drawing Sheets

Related U.S. Application Data continuation of application No. 15/611,435, filed on Jun. 1, 2017, now abandoned.

(60) Provisional application No. 62/344,122, filed on Jun. 1, 2016.

(51) Int. Cl.
    *B08B 3/08*     (2006.01)
    *B08B 3/10*     (2006.01)
    *B08B 3/12*     (2006.01)
    *B08B 7/00*     (2006.01)
    *B29C 64/40*     (2017.01)
    *B33Y 40/20*     (2020.01)

(52) U.S. Cl.
    CPC ............... *B08B 3/102* (2013.01); *B08B 3/12* (2013.01); *B08B 7/0071* (2013.01); *B29C 64/40* (2017.08); *B33Y 40/20* (2020.01); *B08B 2203/007* (2013.01)

(56) References Cited

U.S. PATENT DOCUMENTS

| | | | |
|---|---|---|---|
| 5,470,465 A | 11/1995 | Moorehead et al. | |
| 5,499,643 A | 3/1996 | Vincent, Jr. et al. | |
| 5,810,036 A | 9/1998 | Hoover et al. | |
| 5,961,937 A * | 10/1999 | Gobbato | A61L 2/26 422/292 |
| 6,568,409 B1 | 5/2003 | Fleck | |
| 7,546,841 B2 | 6/2009 | Tafoya | |
| 8,459,280 B2 | 6/2013 | Swanson et al. | |
| 8,636,850 B2 | 1/2014 | Narovlyansky et al. | |
| 2003/0172964 A1* | 9/2003 | Huang | B08B 3/02 134/199 |
| 2006/0243309 A1* | 11/2006 | Prescott | B01D 41/04 134/198 |
| 2007/0175496 A1* | 8/2007 | Rattray | B08B 3/12 134/109 |
| 2008/0210280 A1* | 9/2008 | Publ | B08B 3/02 134/57 R |
| 2009/0000646 A1* | 1/2009 | Durant | B08B 9/023 134/33 |
| 2009/0241997 A1 | 10/2009 | Tafoya | |
| 2009/0283119 A1* | 11/2009 | Moussa | B29C 71/04 134/147 |
| 2010/0170540 A1 | 7/2010 | Kritchman et al. | |
| 2010/0307544 A1 | 12/2010 | Lele et al. | |
| 2011/0186081 A1 | 8/2011 | Dunn et al. | |
| 2011/0197931 A1 | 8/2011 | Ng et al. | |
| 2014/0273500 A1* | 9/2014 | Tice | H01L 21/6708 438/747 |
| 2015/0209836 A1 | 7/2015 | Dunn et al. | |
| 2016/0074911 A1* | 3/2016 | Dore | B29C 64/35 134/56 R |
| 2016/0325507 A1* | 11/2016 | Chu | B08B 3/047 |
| 2017/0021386 A1* | 1/2017 | Chaves | B05B 9/0403 |
| 2017/0036249 A1* | 2/2017 | Tafoya | B29C 64/35 |
| 2018/0215096 A1 | 8/2018 | McMahon et al. | |
| 2018/0215106 A1* | 8/2018 | McMahon | B08B 3/006 |

* cited by examiner

APPARATUS AND METHOD FOR SUPPORT REMOVAL

CROSS REFERENCE OF RELATED APPLICATIONS

This application is a divisional of U.S. patent application Ser. No. 16/519,237 (filed on Jul. 23, 2019), which is a continuation of U.S. patent application Ser. No. 15/611,435 (filed Jun. 1, 2017), which claims the benefits of U.S. Provisional Application No. 62/344,122 (filed Jun. 1, 2016), the disclosures of each of which are incorporated by reference herein in their entirety.

TECHNICAL FIELD

The present disclosure pertains generally to an apparatus and method for removing support material from a part formed by three-dimensional printing.

BACKGROUND

Various systems exist for removing support material from a 3D printed part. These systems often relate to methods for agitating a 3D printed part in a liquid media designed to erode support material surrounding the part. Additional known methods of support removal for three dimensional objects include raising and lowering temperature in a support removal tank to melt the support material, where the support material has a lower melting point than the part. Known systems may utilize a single tank into which the raw part is submerged, or they may include multiple tanks having different properties, including differing temperature or liquids.

U.S. Pat. No. 8,636,850 to Narovlyansky discloses a method for removing the support structures from 3D objects using a liquid jet. The '850 process generally involves inserting two or more objects made by solid freeform fabrication into a cell having an inlet to receive a high-pressure liquid jet located at a top side of the cell and a plurality of draining perforations at the circumferential wall of the cell.

U.S. Pat. No. 8,459,280 to Swanson discloses a support structure removal system comprising a reservoir tank and base unit. The vessel comprises a vessel body, a porous floor configured to retain a 3D part, and an impeller rotatably mounted below the porous floor. The impeller is rotated under magnetic force to agitate the solution around the part. Further, the tank may have a means for adjusting pH and temperature to promote support removal.

U.S. Pat. No. 7,546,841 to Tafoya discloses a device for support removal using liquid agitation and heat in a tank. Communication between a thermocouple in the tank and a microprocessor monitors the temperature in the tank and adjusts conditions accordingly.

The above systems often require manual adjustment throughout the process to adjust for various parts. The above systems may be optimally designed for certain types of parts, and may work well for parts of known and tested sizes, shapes and materials. However, when new types of parts are introduced to the system, much adjustment in setting parameters such as heat, pH, and time is required on the part of the operator to optimize efficient use of energy and time.

Therefore, the drawbacks of the current support removal systems include a lack of efficiency when used for a wide variety of parts. Further, movement of the center of mass of the part throughout the tank increases inefficiency and provides an opportunity for delicate parts to collide with the walls of the tank or components of the machine. Such collisions may cause the part to fracture, and also increase inefficiency through uncontrolled movement within the tank.

Efficient support removal for a wide variety of materials and part shapes and sizes requires a system that is responsive to changes in the part and the working environment surrounding the part. Further, a system is desired that can measure the parameters of the part, either directly or indirectly, and adjust automatically to unique properties of each part. Therefore, a need exists for a support removal machine that can efficiently handle the wide and expanding variety of part types encountered in the fast-growing field of three dimensional printing.

SUMMARY

In the present disclosure, a solution to the problems of existing support removal devices is provided through a machine design that maximizes energy efficiency. The present disclosure describes a support removal machine that responds automatically to changing conditions within a tank and structural changes in the part while maintaining the part in optimal location within the tank for support removal. The continuous regulation of part motion and tank parameters, through a novel combination of liquid flow, heat, ultrasonic radiation, and measurement capabilities, maximizes the use of energy and minimizes damage to the part.

Hydraulic pressure oscillates and suspends a 3D printed part while interrogating with ultrasonic frequencies. A key functional feature of the present disclosure is the ability to maintain the position of the part in a generally central location in the tank. This is accomplished through the use of manifolds positioned at specific locations throughout the tank to create a rotational liquid flow that creates liquid current that sinks parts that would otherwise float and floats parts that would otherwise sink. Under these rotational flow conditions, parts are centrally located submerged in the tank and rotate along with the flow of the liquid. In one embodiment, one or more manifolds may be located at the bottom of the tank along with one on the weir wall. The locations of the pump connected to the manifolds allows for the use of commercially available pumps, rather than custom built pumps, because the manifolds were designed around the pumps.

Rotation of the part within the liquid mass creates friction between the materials in the liquid mass and the part, thereby causing support removal. Support removal is enhanced by ultrasonic transducers placed tangentially in the tank to the rotating object. The ultrasonic generators create heat within the designated liquid mass within the tank, which enhances support removal, while also causing cavitation through direct interaction with the rotating part. The part generally circulates around a central point in a tank, and the part itself rotates. The motion of the part in the tank creates a controlled agitation. As the part spins and circulates within the mass, each aspect of the part is exposed to the ultrasonic waves, thereby creating a synergistic effect in support removal through the circulatory and rotational effects of part motion and the ultrasonic enhancement of support destruction.

The ultrasonic interrogation of the part creates heat and cavitation in a generally uniform manner across the part. However, a heating unit in the tank is also used to generate heat for support removal. The heating unit and the ultrasonic generator operate in harmony, such that when the ultrasonic generator needs to be dialed down, the heater can compensate by maintaining the heat of the mass at an optimal level. An advantage of using ultrasonic radiation resulting cavitation of the liquid mass, which a heater and pump will not create. Overuse of an ultrasonic device can degrade the liquid mass such that the fluid becomes exhausted. The part material is energy sensitive to deformation or delaminating so the constant optimization of energy use with regard to an ultrasonic component is important.

The use of an ultrasonic transducer has dual effects, such that the ultrasonic transducer may be considered more of a mixing component for the liquid mass rather than a heater. While heating with an ultrasonic transducer may require more energy than the use of a standard heating unit, the ultrasonic transducer has multiple effects due to the particular effect of ultrasonic radiation on the parts. While regulating the work that the ultrasonic transducer is doing, the device is characterizing. Ultrasonic radiation affects the surface of the part microscopically by causing vibration, thus, the work being done by the ultrasonic generator goes beyond heat alone, and creates a synergistic effect on support removal, causing the removal of support material in less time.

Another important feature of the support removal machine of the present disclosure is the inclusion of two linked tanks, an output, or part-containing tank, and an input tank. The liquid mass, which may be a detergent, flows from the bottom of the input tank through a manifold into the output tank, generating a pressure and rotational flow within the output tank. Importantly, there is no suction means to withdraw fluid from the output tank during operation. Fluid from the output tank continually flows from the output tank back into the input tank over a weir at the top of the outflow tank.

Therefore, the liquid level of the input tank is below that of the output tank, allowing the liquid mass to be discharged from the output tank over barrier between the output tank and the input tank, thereby forming a weir. The weir provides both oxygenation and cooling to the liquid mass; essential functions in maintaining optimal conditions for support removal. The wall separating the two tanks that allow formation of the weir is important because it allows for simultaneous oxygenation and temperature reductions, without the inclusion of additional costly or energy consuming features to regulate these parameters. The liquid mass and the weir cascade rely on the properties of each to maintain a proper balance of oxygenation, pH and evaporation. The machine and liquid mass have been thoroughly tested to optimize the interaction between the weir and the liquid mass.

Through use of the machine, the liquid mass is consumed, and is eventually required to be replaced. Throughout use, however, the level of liquid mass in the output tank is maintained, and kept full. As the liquid mass is consumed, the liquid level of the inflow tank decreases. Once the level decreases to a certain point, a liquid level sensor in the inflow tank is triggered, signaling the operator to replenish the liquid mass. Unlike other support removal machines and systems, the support removal machine of the present disclosure does not require the user to empty and refill the tank, rather, the conditions of the liquid mass are calibrated such that refilling the inflow tank when the level is decreased to a set point is sufficient to maintain operation of the system virtually indefinitely.

BRIEF DESCRIPTION OF THE DRAWINGS

Preferred embodiments of the present invention will now be described, by way of example only, with reference to the attached Figures, wherein.

DETAILED DESCRIPTION

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention.

Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, processes, interfaces, electrical structures, circuits, etc. are not described in detail, or are shown in block diagram form, in order not to obscure the present invention.

The terms "support", "support material" and "support structure" as used throughout the specification and claims should be construed in their broadest interpretation to include any material or materials used for provisional support during fabrication of a 3D object and that is not part of the three-dimensional object. The support may include materials that are different than the modeling materials used to fabricate the 3D object or a combination of modeling materials and materials that are different than the modeling materials used to fabricate the 3D object.

Figure 1:
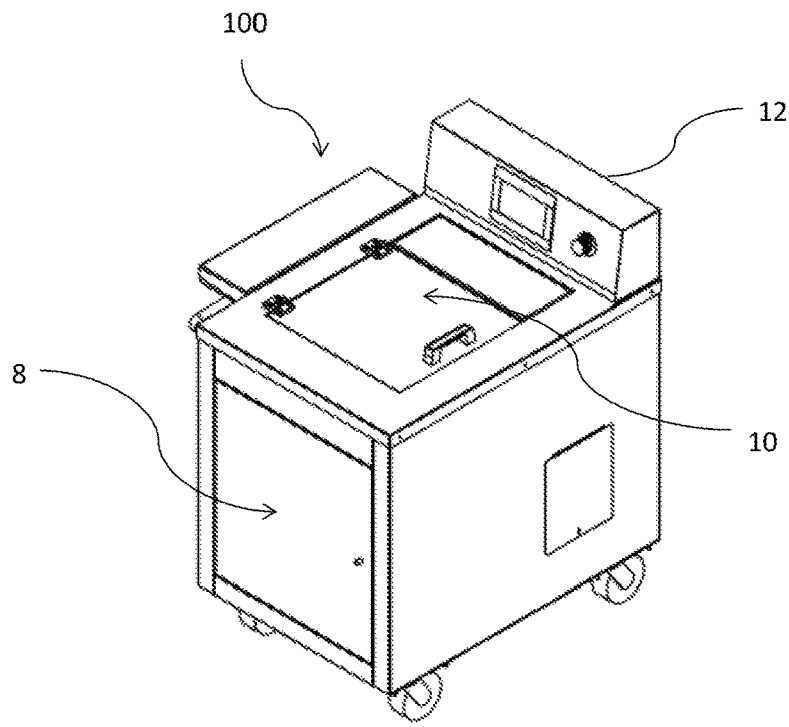
FIG. 1 shows a perspective view of the support removal machine in accordance with the present disclosure.

Referring now to FIG. 1, one embodiment of a support removal machine in accordance with the present invention is shown. Support removal machine has a lid 10, which an operator may open to allow placement of a 3D part 40 (shown in FIG. 8) having support material. Control panel 12 allows a user to input initial pre-determined parameters such as temperature and time. Front panel 8 may be opened to allow access to the tanks, pump, and other internal components of support removal machine 100.

Figure 2:
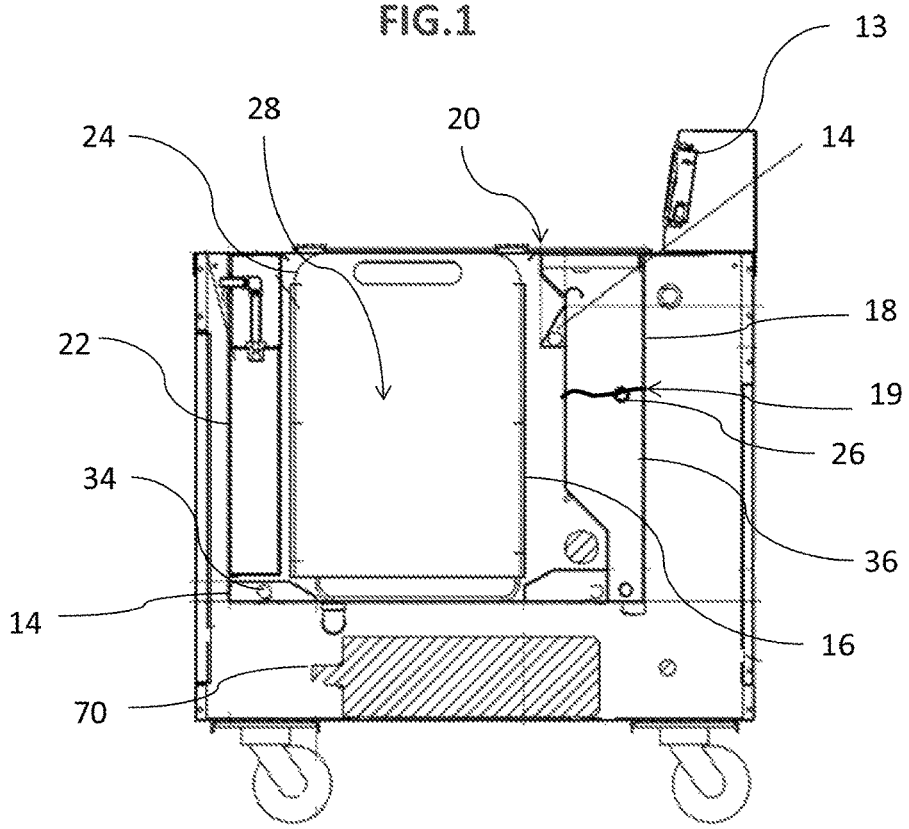
FIG. 2 shows a cross-sectional side view of the support removal machine in accordance with the present disclosure.

Referring now to FIG. 2, a cross-sectional side view shows various components essential to support removal machine 100. When part 40 is placed into support removal machine 100 through lid 10, it enters output tank 16, which may be alternatively referred to as a part-containing tank 16, wherein the part 40 may be contained in parts basket 24. Output tank 16 is filled with a liquid mass 28 which flows circularly from input tank 18 in response to activation of a pump 30 (shown in FIG. 3A), which causes the liquid mass 28 to flow under pressure from tank manifold 14. In some embodiments, there may only be a single tank, which may be referred to as a part-containing tank 16. PC 13 is shown centrally located in control panel 12. Ultrasonic generator 70 is shown below output tank 16.

During operation of support removal machine 100, energy of liquid mass 28 may be regulated, and oxygenation, or aeration, of liquid mass 28 may maintain proper chemistry. To avoid introducing additional components to oxygenate (aerate) and decrease temperature when necessary, a weir 20 may exist between output tank 16 and input tank 18. Weir 20 may be comprised of a wall 36, or attenuating wall for its effect on ultrasound, between output tank 16 and input tank 18. The flow of liquid mass 28 from output tank 16 to a lower point in input tank 18 over wall 36 creates a passive system for achieving proper temperature and oxygenation states in the liquid mass. A positive pressure in output tank 16 created by flow into output tank 16 from pump 30 generates an overflow across wall 36 without a need for active suction from output tank 16, thus creating a system that eliminates the potential for damage to part 40 caused by suction from output tank 16. There is a negative pressure in input tank 18 that corresponds to the positive pressure in output tank 16. During operation of support removal machine 100 the liquid mass will naturally evaporate. Liquid level sensor 26 which in some embodiments may be continuous, notifies a user when the liquid mass 28 level needs maintenance. An alternative embodiment may comprise one tank or multiple tanks.

In a preferred embodiment, a feature of the support removal machine 100 of the present disclosure is the inclusion of two linked tanks, output tank 16 and an input tank 18, wherein the output tank 16 contains part 40 and the input tank 18 may contain a conditioned liquid mass 28. In the preferred embodiment, liquid mass 28, which may be a detergent, is pumped through a pump 30 from a lower area of input tank 18 through multiple manifolds 14 into output tank 16, generating a hydraulic pressure and rotational flow within output tank 16. In a preferred embodiment, pump 30 is positioned below input tank 18. The location of pump 30 may be important because, in one embodiment, pump 30 is not self-priming, and therefore, requires liquid mass 28 to be pumped to feed into pump 30 above the pump inlet. Manifolds 14 are positioned to be capable of directing a flow of liquid mass 28 in order to create a circularized flow, or vortex, in output tank 16. This flow allows for uniform exposure of all aspects of the part 40 to means of support removal, including, but not limited to, ultrasound, heat, and chemical treatment. In a preferred embodiment, no means of suction exists for withdrawal of liquid mass 28 from output tank 16 into input tank 18 during operation. Liquid mass 28, in a preferred embodiment, flows over the weir 20 as liquid mass 28 is pumped from input tank 14 to output tank 16. In a preferred embodiment, pump 30 is a magnetically coupled centrifugal pump. Pump 30 may be placed at a location beneath the level of the input tank 18 or output tank 16. In one embodiment, pump 30 has a motor that operates at 50/60 Hz and is not adjusted.

In the preferred embodiment, input tank liquid level 19 is below that of the output tank 16, allowing the liquid mass 28 to be discharged from the output tank 16 over a wall 36 between the output tank 16 and the input tank 18, thereby forming a weir 20. Weir 20 has a wall 36 to separate liquid mass 28 between output tank 16 and input tank 18. The weir 20 should be located just above upper manifold 14, allowing the rotational flow to continue within the output tank 16, while allowing liquid mass 28 to flow over weir 20 in a laminar fashion. In a preferred embodiment, the distance between liquid mass 28 level in the output tank 16 and the liquid level in input tank 18 may be between 2 inches and 12 inches.

Weir 20 provides both oxygenation and cooling to liquid mass 28, which are essential functions in maintaining optimal conditions for support removal. The cooling effect of weir 20 allows temperature of liquid mass 28 to be controlled with much tighter tolerances, even at low temperature settings. Weir 20 therefore allows the user to process delicate parts 40 that would normally be in danger of being damaged or altered due to temperature overshoot. Wall 36, which separates output tank 16 and input tank 18 to form weir 20 allows for simultaneous oxygenation, or aeration, and temperature reductions without the inclusion of additional costly or energy consuming features to regulate these parameters. Liquid mass 28 and weir 20 create a cascade to regulate oxygenation, pH and evaporation. Parameters of weir 20 have been optimized for efficiency of support removal.

As liquid mass 28 is consumed or exhausted through evaporation, mechanical, or chemical or other means, the consumed portion may require replacement. The level of liquid mass 28 in output tank 16 and input tank 18 is therefore monitored and maintained. As the liquid mass 28 is consumed, the liquid level of the input tank 18 decreases. Once the liquid mass 28 level in input tank 18 decreases to a certain point, a liquid level sensor 26, which may be a continuous liquid level sensor, in input tank 18 is triggered, signaling the operator to replenish or restore liquid mass 28. Unlike other support removal machines and systems, the support removal machine 100 of the present disclosure may not require the user to empty and refill the system completely, rather, the conditions of the liquid mass 28 are calibrated such that refilling the system when the level of liquid mass 28 is decreased to a set point may be sufficient to maintain operation of the system indefinitely.

Support removal machine 100 may respond automatically to changing conditions within output tank 16 and input tank 18, and structural changes in the part 40, while maintaining part 40 in an optimal location within output tank 40 for support removal. The continuous regulation of the position, circulation, and rotation of part 40 occurs in response to output tank 16 parameters, subject to a combination of parameters including liquid mass 28 flow, heat, ultrasound, and measurement capabilities, such that the use of energy in support removal machine 100 is maximized and damage to part 40 is minimized.

The flow of liquid mass 28, generated as liquid mass 28 passes through a set of tank manifolds 14, is generally rotational such that the liquid mass 28 is a vortex and that part 40 does not, due to the rotational flow of liquid mass 28, generally contact the surface of liquid mass 28. The position of manifolds 14 and the direction of the flow of liquid mass 28 generated from manifolds 14 creates a vortex that suspends part 40 between a surface of the liquid mass 28 and a bottom and sides of output tank 16. In an alternative embodiment of the present disclosure, a single tank having a pump may generate flow to effectively rotate part 40 in a single chamber.

Figure 3A:
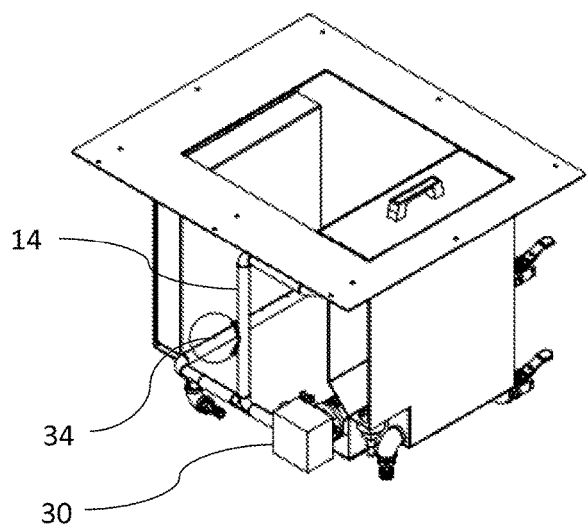
FIGS. 3A-C show a side perspective, magnified and cross sectional view, respectively, of the manifold and nozzle orifice within the support removal machine in accordance with the present disclosure.
Figure 3B:
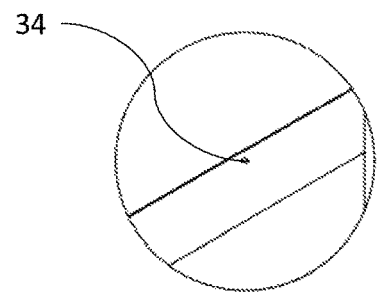
Figure 3C:
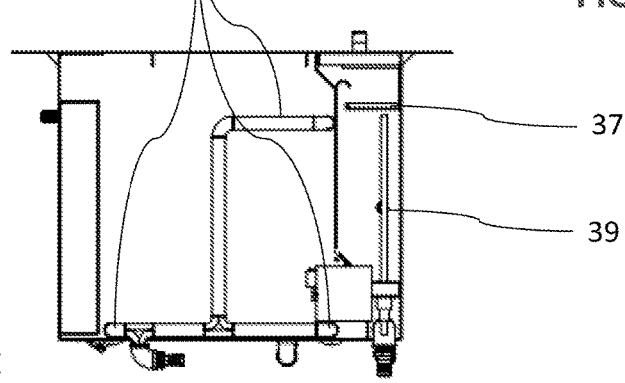

Referring now to FIGS. 3A-C, manifolds 14 and nozzle orifices 34 are shown. The position of the manifolds 14 within output tank 16 is important in creating a circular flow of liquid mass 28. FIG. 3C shows a continuous level sensor 39, which floats to convey liquid mass level in input tank 18. Sedimentation plate 37 is shown in FIG. 3C.

Figure 4A:
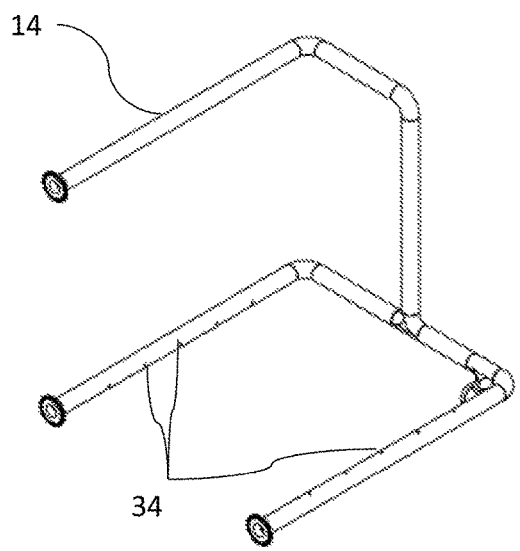
FIGS. 4A and 4B show side perspective views of the manifold and nozzle orifices in accordance with the present disclosure.
Figure 4B:
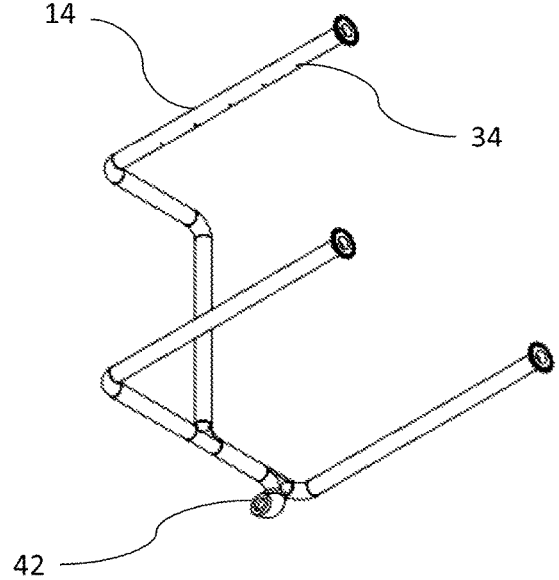

As shown in FIGS. 3A-C, and 4A and 4B, in a preferred embodiment, three manifolds 14 are positioned symmetrically around the output tank, where each manifold 14 is positioned along a different surface of output tank 14 at a junction between two sides of output tank 16. Two manifolds 14 are positioned on opposite sides, a first and second side, of output tank 14 (as shown in FIG. 4A where nozzle orifices 34 are positioned at 90 degrees on manifolds adjacent opposite sides of output tank 16). Adjacent manifolds 14 have a series of in-line nozzle orifices 34, wherein nozzle orifices 34 are offset 90 degrees on each adjacent manifold 14, such that the nozzle orifices 34 project liquid mass 28 parallel to adjacent sides, resulting in a rotational flow of liquid mass 28 in three directions at generally 90 degree angles along three sides of output tank 90. This arrangement of manifolds 14 and orifice nozzles 34 induces a circular, rotational flow of liquid mass 28 and creates a vortex within the output tank 16. Each manifold 14 may extend the entire width of output tank 16 and may contain a varied number of nozzle orifices 34 along manifold 14, although embodiments may vary. In a preferred embodiment, the number of nozzle orifices 34, each aligned in-line along manifold 14, is five. The number of manifolds 14 may be important in order to create appropriate pressure on liquid mass 28 in order to produce appropriate rotational flow to maintain part 40 in a central location in output tank 16. In a preferred embodiment, each manifold 14 is fed liquid mass 28 from the pump 30 with equal pressure from pump 30 through manifold inlet 42, as shown in FIG. 4B. The apparatus and method of the present disclosure may not be limited to a particular number of tanks. Manifolds 14 may extend laterally along the junction between sides of output tank 16.

Referring now to FIGS. 4A and 4B, the manifolds are shown. The manifold 14 has a nozzle orifice 34. The diameter of nozzle orifice 34 may vary depending on the desired conditions for optimizing liquid mass 28 pressure for support removal. Manifolds 14 and nozzle orifices 34 are positioned generally symmetrically around output tank 16 (as shown in FIG. 2) and approximately at an edge along sides or side junctions of output tank 16 in order to propel liquid mass 28 in a plane with sides of output tank 16 such that a vortex is generated to maintain the position of the part 40 centrally within output tank 16 (see FIG. 8). Table 1 shows how orifice size effects flow of liquid mass 28.

TABLE 1

Max Jet Velocity (ft/s)

| | Distance From Orifice (in.) | | | |
|---|---|---|---|---|
| | 1/16" Orifices | 1/8" Orifices | 3/16" Orifices | 1/4" Orifices |
| 0 | 69.71694 | 17.42923 | 7.746327 | 4.357309 |
| 1 | 43.57309 | 10.89327 | 4.841454 | 2.723318 |
| 2 | 21.78654 | 5.446636 | 2.420727 | 1.361659 |
| 3 | 14.52436 | 3.631091 | 1.613818 | 0.907773 |
| 4 | 10.89327 | 2.723318 | 1.210364 | 0.680829 |
| 5 | 8.714617 | 2.178654 | 0.968291 | 0.544664 |
| 6 | 7.262181 | 1.815545 | 0.806909 | 0.453886 |
| 7 | 6.224727 | 1.556182 | 0.691636 | 0.389045 |
| 8 | 5.446636 | 1.361659 | 0.605182 | 0.340415 |
| 9 | 4.841454 | 1.210364 | 0.537939 | 0.302591 |
| 10 | 4.357309 | 1.089327 | 0.484145 | 0.272332 |
| 11 | 3.96119 | 0.990297 | 0.440132 | 0.247574 |
| 12 | 3.631091 | 0.907773 | 0.403455 | 0.226943 |

Figure 5:
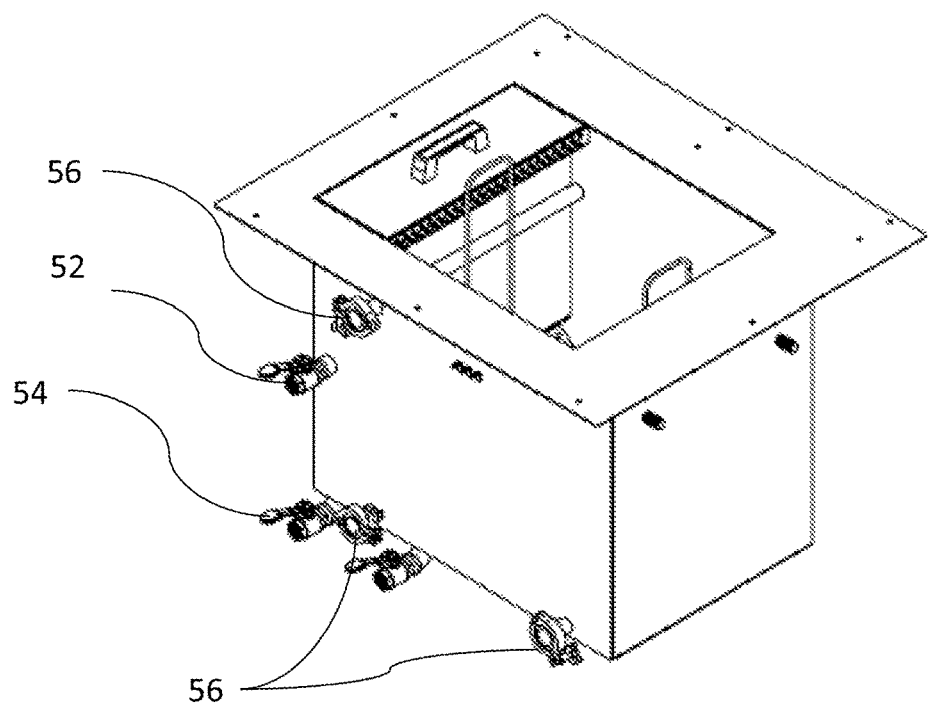
FIG. 5 shows a side perspective view of tank drains and cleanout ports in accordance with the present disclosure.

Referring now to FIG. 5, overflow tank drain 52 is shown. Sediment tank drain 54 is shown. Cleanout ports 56 are shown. The number of outlets for each purpose is not limiting.

Figure 6:
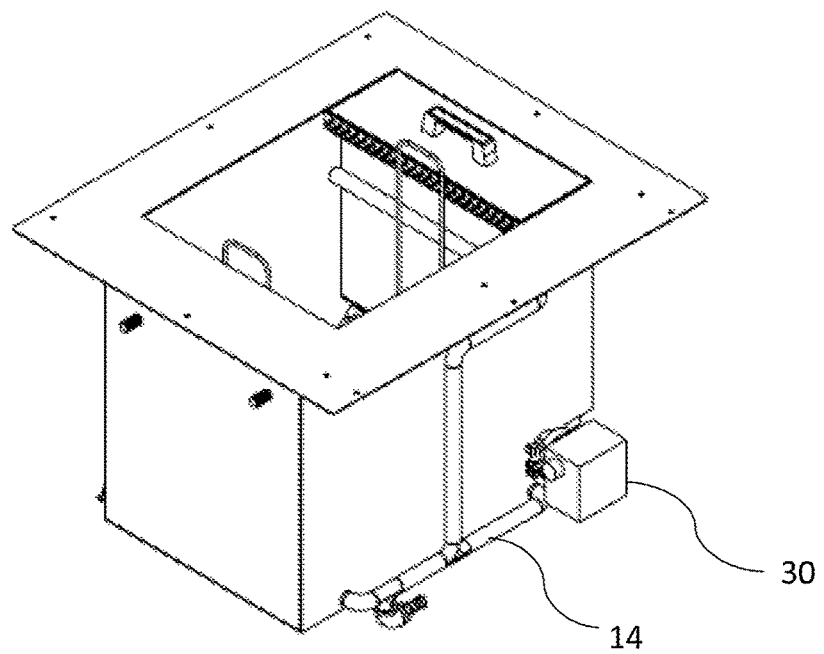
FIG. 6 shows a side perspective view the pump and manifold in accordance with the present disclosure.

Referring now to FIG. 6, pump 30 and manifolds 14 are shown.

Figure 7:
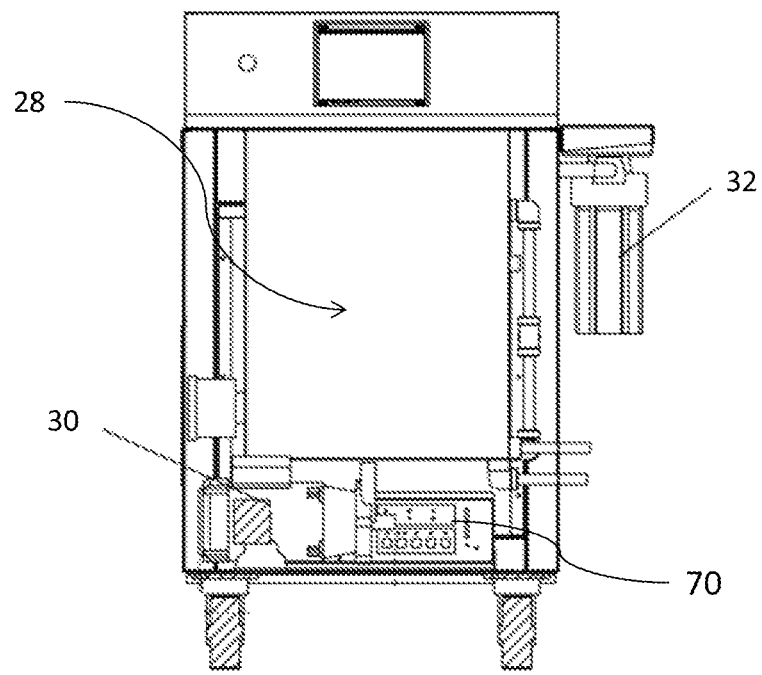
FIG. 7 shows a cross-sectional rear view of the support removal machine in accordance with the present disclosure.

Referring now to FIG. 7, a cross-sectional rear view shows mechanisms for pumping and filtering the liquid mass 28. Filter 32 removes particulate matter generated during support removal as pieces of the support break apart. Pump 30 generates the pressure that forces the liquid through tank manifolds 14. Pump 30 may be a commercially available pump, when used with the support removal machine 100 of the present disclosure, and would not require a custom build. The present disclosure is not limited to commercially available pumps. Pump 30 generates sufficient pressure, without the need for suction within the output tank 16, to provide rotational flow such that the part is maintained in a centrally located position within output tank 16. Ultrasonic generator 70, or ultrasonic motor, supplies power for ultrasonic transducers, which may number between 16-24 without limitation.

Hydraulic pressure oscillates and suspends a 3D printed part while interrogating with ultrasonic frequencies. A key functional feature of the present disclosure is the ability to maintain the position of the part 40 in a generally central location in output tank 16. Maintaining position of part 40 is accomplished through the use of manifolds 14 positioned at locations throughout tank 40 to create a rotational liquid flow, or vortex, that creates liquid current to sinks a part 40 that would otherwise float and to float a part 40 that would otherwise sink. Under the rotational flow conditions generated by the apparatus and method of the present disclosure, a part 40 is centrally located, submerged in a tank and circulated around a central axis of the tank, along with being rotating around an axis of the part 40. In one embodiment, one or more manifolds may be positioned on the walls of the tank at certain locations along output tank 16 including one position immediately adjacent to weir 20 on wall 36. The location of pump 30, connected to the manifolds 14, allows for the use of commercially available pumps, rather than custom built pumps, because the manifolds were designed around the performance, or operating abilities, of the pumps. However, custom built pumps are contemplated within the present disclosure.

Rotation of part 40 within the liquid mass 28 creates friction between the materials in the liquid mass 28 and the part 40, resulting in support removal. In one embodiment, support removal is enhanced by ultrasonic transducers 22 placed tangentially in output tank 16 with respect to rotating part 40. Ultrasonic generator 42 creates heat in liquid mass 28 within output tank 16, which causes support removal through multiple direct and indirect means, while also causing cavitation through direct interaction with the rotating part 40. As the part 40 spins within the liquid mass 28, each aspect of part 40 is exposed to ultrasound, thereby creating a synergistic effect in support removal through rotational effects in liquid mass 28 and the ultrasonic enhancement of support removal.

Figure 8:
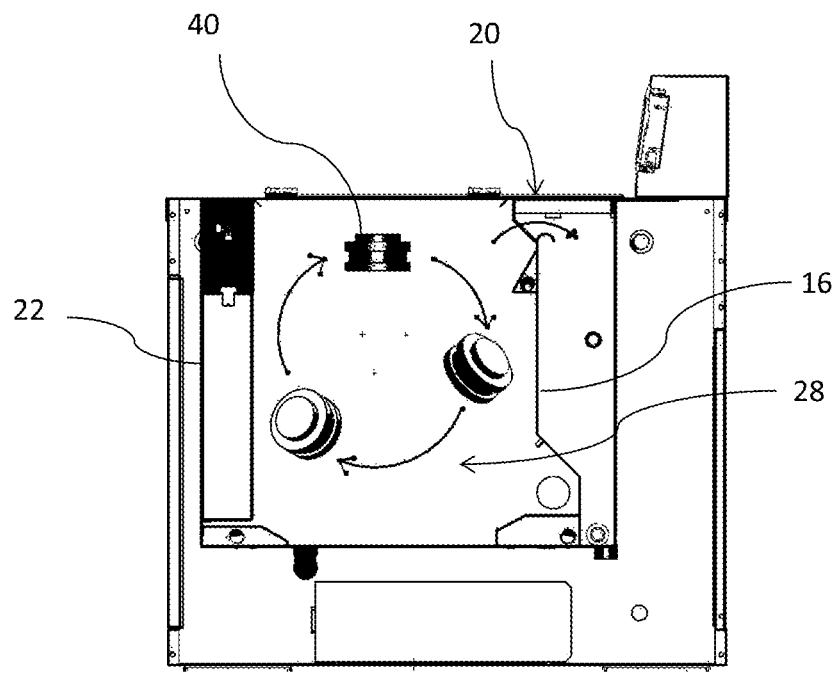
FIG. 8 shows a cross-sectional side view of a part at is rotates within a chamber in accordance with the present disclosure.

Referring now to FIG. 8, a cross-sectional side view shows the flow of liquid mass 28 during pumping by pump 30, as indicated by the curved arrows in output tank 16, along with the concomitant rotation of 3D printed part 40. As illustrated in FIG. 8, as 3D printed part 40 rotates in the center of output tank 16, different surfaces of 3D part 40 are exposed to tangential radiation from ultrasonic transducer 22. Ultrasonic transducer 22 interrogates part 40 as part 40 rotates in output tank 16. Part 40 may be tangential to ultrasonic transducer 22, and rotation of part 40 allows all aspects of the part 40 to be exposed to ultrasound. Part 40 generally circulates around a central point in output tank 16, and part 40 rotates. The motion of part 40 in output tank 16 creates a controlled agitation. The action of part 40 during this process therefore creates support removal through friction by continuous rotational motion of 3D printed part 40 within the detergent, along with a uniform interrogation from ultrasonic transducer 22, thereby generating synergy in support removal between the action of the pump, the heater, the chemistry and the ultrasonic transducer.

The ultrasonic interrogation of part 40 creates heat and cavitation in a generally uniform manner across the part as it rotates and circulates through output tank 16, exposing each surface of part 40 to the ultrasound. Additionally, a heating unit may also be used to generate heat for enhancing support removal. The heating unit and the ultrasonic generator 70 may operate in harmony, such that when the ultrasonic generator 70 needs to be dialed down, the heating unit can compensate by maintaining the heat of the mass at an optimal level. A heating unit may be positioned wherein said heating means comprises a heating element having an internal end positioned internally in the output chamber 16 to engage the liquid mass and an external end communicatively coupled to said microprocessor for controlling heat input to the liquid mass contained within the output chamber 16. An advantage provided by the use of ultrasound is the creation of cavitation of liquid mass 28, which a heater and pump 30 may not do. Overuse of the ultrasonic transducer 22 may degrade the liquid mass 28 such that liquid mass 28 becomes exhausted. The part 40 material may be energy sensitive to deforming or delaminating such that constant optimization of energy within the system is important.

The use of an ultrasonic transducer 22 has dual effects, such that the ultrasonic transducer 22 may be considered a mixing component for liquid mass 28 rather than an just a heater. While heating with an ultrasonic transducer 22 may require more energy than the use of a standard heating unit, the ultrasonic transducer 22 has multiple effects. Ultrasound affects the surface of part 40 microscopically by causing vibration, thus, the work being done by ultrasonic transducer 22 extends beyond heating alone, thus creating a synergistic effect for support removal, and increasing efficiency of the process.

It is obvious that the components comprising the support removal apparatus may be fabricated from a variety of materials, providing such selection or use of materials possess the capacity to withstand premature corrosion given the presence and use of an alkaline aqueous cleaning solution, notably falling within a variety of pH ranges. The tank can be made of 304 and/or 316 SS or any steel alloy with better corrosion resistance than 316 SS. Accordingly, it is most desirable, and therefore preferred, to construct the output tank and input tank work surface, top and nozzle heads from stainless steel; pipe and fittings from a polymeric material such as polyamide (PA) or acrylonitrile-butadiene-styrene (ABS); and cabinet and storage cabinet from a lower grade stainless steel. It is noted herein that the retention tank, nozzle head, work surface, and integral work platform may be alternatively fabricated from materials to lessen the overall weight of the support removal apparatus yet maintaining sufficient resistance to corrosion, such as polypropylene, polyoxymethylene, polyphenylene, ABS, or PA. Similarly, the pump, thermocouple, heating element 38, and level indicator, particularly exposed operable components of each, are fabricated from a high grade stainless steel or coated with an impervious, corrosive-resistant material such as epoxy.

Although the disclosure has been described with reference to certain preferred embodiments, it will be appreciated by those skilled in the art that modifications and variations may be made without departing from the spirit and scope of the disclosure. It should be understood that applicant does not intend to be limited to the particular details described above and illustrated in the accompanying drawings.

I claim:

1. A support structure material removal apparatus, comprising:
   a first tank having walls and a base collectively forming a first tank chamber for containing a portion of a liquid mass and a part having support structure material;
   a second tank having walls and a base collectively forming a second tank chamber for containing a portion of the liquid mass; wherein the first tank chamber and the second tank chamber are in liquid communication;
   a pump for causing the liquid mass to flow from the second tank to the first tank;
   manifolds located along the walls of said first tank, said manifolds having orifices located in-line along each of said manifolds to project the liquid mass in a plane parallel to adjacent walls of said first tank for producing a rotational flow and thereby create a vortex of the liquid mass in the first tank; and
   a weir between the first tank and the second tank, and wherein the liquid mass in the first tank is able to flow into the second tank while being maintainable at a level higher than a level of a level of the liquid mass in the second tank.

2. The support structure material removal apparatus of claim 1, further comprising a level indicator positioned in the second tank for transmitting level measurements of the liquid mass present in the second tank.

3. The support structure material removal apparatus of claim 1, wherein the pump is attached to intake and outlet piping; and wherein the intake piping is in fluid communication with the second tank, and the outlet piping is in fluid communication with the manifolds.

4. The support structure material removal apparatus of claim 1, further comprising a basket positioned within the first tank chamber, the basket having perforated walls to permit passage of the liquid mass and inhibiting passage of parts, and an opening extending through one of the perforated walls to permit access to an interior portion of the basket, the basket further comprising an overall configuration capable of fitting through an opening in the apparatus for positioning the basket within the first tank.

5. The support structure material removal apparatus of claim 1, further comprising one or more ultrasonic transducers for providing ultrasonic radiation to the part in the first tank.

6. The support structure material removal apparatus of claim 1, wherein
   the walls of the first tank include a first side and a second side; and
   the base comprises a bottom surface; and
   the first side is opposite the second side; and
   the manifolds further comprise:
   a first manifold section positioned at a top portion of the first side; and
   a second manifold section proximal to a junction between the first side and the bottom surface.

7. The support structure material removal apparatus of claim 6, wherein the manifolds further comprise a third manifold section proximal to a junction between the second side and the bottom surface.

8. The support structure material removal apparatus of claim 7, wherein:

the first manifold section is configured to direct a downward flow of liquid mass along the first side;

the second manifold section is configured to direct a lateral flow of liquid mass along the bottom surface toward the second side, and the third manifold section is configured to direct an upward flow of liquid mass along the second side.

9. The support structure material removal apparatus of claim 1, wherein the manifolds are positioned in order to generate a vortex within the liquid mass in the first tank chamber.

10. A support structure material removal apparatus, comprising:

a part-containing tank for containing a portion of a liquid mass and a part having support structure material;

manifolds located around the part-containing tank and positioned along different surfaces of the part-containing tank for producing a rotational flow of the liquid mass in the part-containing tank; and a pump for causing the liquid mass to flow via the manifolds to the part-containing tank.

11. The support structure material removal apparatus of claim 10, wherein the rotational flow is a vortex.

12. The support structure material removal apparatus of claim 10, wherein each of the manifolds is located along a different interior surface of the part-containing tank.

13. The support structure material removal apparatus of claim 10, wherein each of the manifolds is located along a different interior surface of the part-containing tank at a junction between two sides of the part-containing tank.

14. The support structure material removal apparatus of claim 10, further comprising at least one ultrasonic transducer located adjacent the part-containing tank for directing ultrasonic radiation into the liquid mass in the part-containing tank.

15. The support structure material removal apparatus of claim 10, wherein the part-containing tank is a single tank.

16. A support structure material removal apparatus, comprising:

an output tank for containing a portion of a liquid and a part having support structure material;

an input tank containing a portion of the liquid;

a pump in a flow path between the input tank and the output tank for pumping liquid from the input tank to the output tank;

manifolds located along different walls of the output tank in the flow path from the pump for producing a vortex of the liquid in the output tank that maintains the part in position centrally within the output tank; and a weir between the output tank and the input tank, wherein the liquid in the output tank is able to flow over the weir into the input tank.

17. The support structure material removal apparatus of claim 16, wherein the manifold has a plurality of orifices.

18. The support structure material removal apparatus of claim 16, wherein the manifold extends along an entire width of the output tank.

* * * * *